Figure 1:
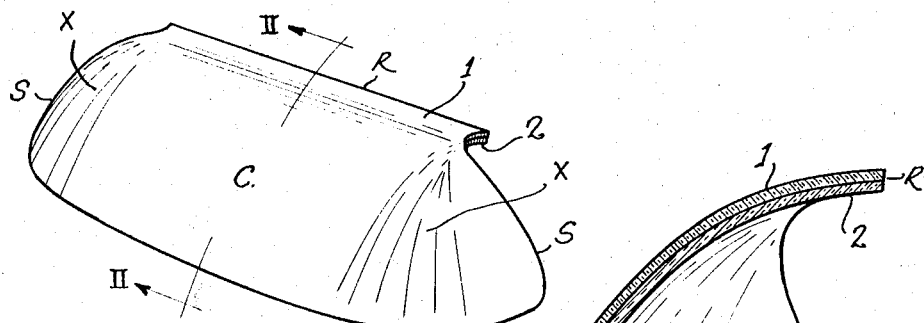

Jan. 24, 1967  R. E. RICHARDSON  3,300,351

ASSEMBLIES OF GLASS SHEETS

Filed Sept. 13, 1960

Ronald E. Richardson
Inventor
By Cushman, Darby & Cushman
Attorneys

3,300,351
ASSEMBLIES OF GLASS SHEETS
Ronald E. Richardson, Oshawa, Ontario, Canada, assignor to Pittsburgh Plate Glass Company, Pittsburgh, Pa.
Filed Sept. 13, 1960, Ser. No. 55,741
Claims priority, application Canada, June 7, 1960, 802,082
3 Claims. (Cl. 156—102)

The present invention relates to the production of assemblies of glass sheets for use in the manufacture of laminated glass structures, especially laminated windshields.

The type of windshield now widely adopted in automobile manufacture consists of a sandwich of two sheets of glass with a synthetic resin interlayer. One stage in the production of these laminated windshields involves the simultaneous bending of two glass sheets to the required curvature. This bending stage is normally carried out by placing a first glass sheet, cut to appropriate size, on a skeleton type bending mold and superimposing thereon a second and similar glass sheet. The mold carrying the glass sheets is then introduced into a bending lehr where the glass is brought to bending temperature. The lower glass sheet softens and bends into conformity with the shaping surface of the mold; the upper glass sheet softens and bends into conformity with the upper surface of the lower glass sheet. A suitable parting material, such as a diatomaceous earth is used as a parting material between the glass sheets so as to prevent their fusion to one another during their simultaneous bending.

With each succeeding year the demands of the designers of automobiles upon windshield manufacturers become more severe. In particular it is increasingly common to require that some parts of the windshield should be bent in two directions at right angles to one another, i.e. both longitudinally and transversely of the windshield. A bend of such a nature is generally referred to as a compound bend.

The increasing complexity of the nature of the bends that must be imparted to the glass sheets for use in the manufacture of laminated shields has resulted not only in a higher incidence of breakage during the bending operation but also in a greater tendency for the assemblies of glass sheets to display optical defects that prohibit their fabrication into windshields. This can be explained as due to the fact that the more complex the curvature imparted to the lower glass sheet the more difficult it is for the upper glass sheet to conform to that curvature when the bending of the sheets is carried out using a skeleton type shaping surface. The skeleton type shaping surface provides positive support for the lower glass sheet only at its edges and portions of the sheet removed from its edges can therefore sag somewhat below the level of the shaping surface. Thus it is always possible for such portions of the lower sheet to move downwardly away from the adjacent portions of the upper sheet when the sheets are heated to bending temperature. The formation of isolated small pockets between the sheets is therefore feasible with serious loss of optical quality in the finished windshield.

Obvious ways of attempting to overcome this difficulty are to keep the glass sheets and the mold within the lehr for a longer period and/or to arrange the heating conditions in the lehr so that the upper glass sheet is more strongly heated than the lower glass sheet. Neither of these expedients has proved to be completely effective.

It is an object of the present invention to provide a method of producing an assembly of two bent glass sheets having a compound bend which is capable of achieving satisfactory optical characteristics of such an assembly more consistently than has been the case with prior methods.

The invention provides a method of producing an assembly of two bent glass sheets having a compound bend comprising supporting a first glass sheet upon a skeleton type shaping surface adapted to impart said compound bend to said first glass sheet, superimposing on said first glass sheet a second glass sheet composed of glass having a greater heat absorptivity than the glass of which said first sheet is composed, and heating the glass sheets to bending temperature. The term "heat absorptivity" is used in this specification and in the appended claims to mean the absorptivity of the glass in the infrared band of the spectrum.

The essence of the invention lies in utilizing an upper sheet of glass having a higher heat absorptivity than that of the glass of which the lower sheet is composed. Upon heating of the two glass sheets in a bending lehr the upper glass sheet absorbs more heat than the lower glass sheet by virtue of its higher heat absorptivity and hence attains a lower viscosity than the lower glass sheet during the simultaneous bending of the two sheets. This lower viscosity enables the upper sheet to soften more quickly than the lower sheet and thus to conform more closely to the shape of the lower sheet than would be the case if the two sheets had equal heat absorptivities, which would tend to equalize the viscosity of the two sheets during simultaneous bending.

It is therefore possible for the upper sheet to follow more faithfully the bending of the lower sheet without formation of pockets.

It would be impractical to attempt to lay down in quantitative terms the degree of difference that must exist between the heat absorptivity of the two types of glass to obtain satisfactory results in accordance with the invention. Whatever the degree of severity of the compound bend that is to be imparted to the assembly of glass sheets the upper sheet will tend to conform better to the curvature of the lower sheet if the heat absorptivity of the glass of the upper sheet is at all greater than that of the glass of the lower sheet. It may therefore be said that there is no lower limit to the difference in heat absorptivity that is capable of affording the benefits of the invention in some particular case. When a severe compound bend has to be made the magnitude of the difference in heat absorptivity is preferably made as great as is compatible with the obtaining of appropriate optical characteristics, the latter requirement obviously imposing some degree of restriction on the types of glass available.

Glasses of varying heat absorptivities are well known so that the selection of the glasses to be utilized for the two glass sheets in the method of the invention offers no difficulty. By way of example, it is generally true that of two glasses which have essentially similar composition except that one contains more iron oxide than the other the one having the higher iron oxide content has the greater heat absorptivity. Two such glasses may therefore be used in the method of the invention, the upper sheet being composed of the glass containing the more iron oxide. Typical analyses of two such glasses are set out below.

| Ingredient | Clear Plate Glass A | Tinted Plate Glass B |
|---|---|---|
| $SiO_2$, percent | 71.6 | 71.4 |
| $Na_2O$, percent | 13.6 | 13.5 |
| $CaO$, percent | 11.7 | 11.7 |
| $MgO$, percent | 2.4 | 2.4 |
| $Fe_2O_3$, percent | 0.1 | 0.5 |
| $Al_2O_3$, percent | 0.2 | 0.2 |
| $SO_3$, percent | 0.4 | 0.3 |

These glasses have very similar compositions except that glass B contains five times as much iron oxide as glass A and accordingly has a greater heat absorptivity. Glass B is therefore used for the upper sheet and glass A for the lower sheet when employing these glasses in the process of the invention. Glass B is actually tinted due to the presence of the iron oxide.

It would scarcely be possible and would serve no purpose to catalogue all of the various types of glass that may be used according to the invention. However, it may be mentioned that glass A is representative of a range of glass compositions used for the inner sides of laminated windshields and glass B is representative of a range of glass compositions used for the outer sides of such windshields. These ranges of composition are set out below.

| Ingredient | Clear Glass | Tinted Glass |
|---|---|---|
| $SiO_2$, percent | 69–74 | 69–74 |
| $Na_2O$, percent | 11–15 | 11–15 |
| CaO, percent | 9–13 | 9–13 |
| MgO, percent | 0.1–5 | 0.1–5 |
| $Fe_2O_3$, percent | 0.01–0.15 | 0.3–0.7 |
| $Al_2O_3$, percent | 0.1–1.3 | 0.1–1.3 |
| $SO_3$, percent | 0.1–0.5 | 0.1–0.5 |
| $Co_3O_4$, percent | 0–0.002 | 0–0.002 |

Both of those types of glass contain a trace of $TiO_2$ which is an impurity in $SiO_2$.

According to the invention the upper glass sheet may be of one of the above-specified tinted glasses and the lower glass sheet may be one of the above-specified clear glasses, the glass compositions selected being such that the upper glass sheet has heat absorptivity sufficiently higher than that of the lower glass sheet to achieve satisfactory optical properties in the assembly of bent glass sheets being produced.

Nowadays it is standard practice to make laminated windshields exclusively of plate glass. The invention is applicable not only to the use of plate glass but also of window glass since the essential feature of the invention lies not in the use of any particular type of glass but in taking two glasses of different heat absorptivity and superimposing the glass of higher absorptivity upon the other glass during the bending operation. Nor is the invention restricted to the production of windshields; it can be applied whenever sheets of glass are to be bent into an identical curvature having a compound bend.

The improved optical properties of the assemblies produced in accordance with the invention are best appreciated when they are tested for double reflection.

Figure 2:
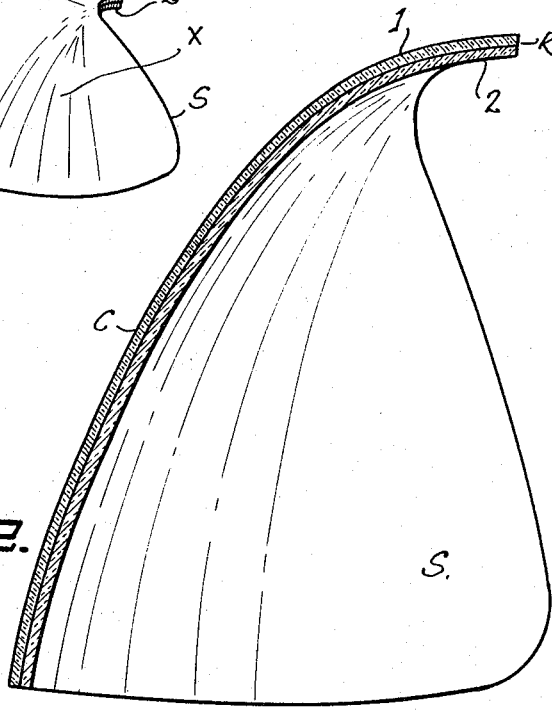
Figure 3:
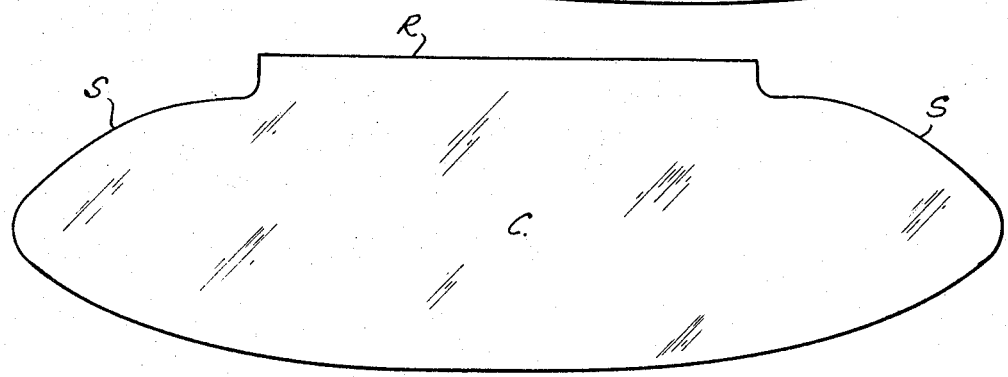

In the accompanying drawings,

FIG. 1 is a perspective view of an assembly of two glass sheets produced in accordance with the present invention, FIG. 2 is a sectional view along the line II—II of FIG. 1, and FIG. 3 is a plan view of one of the two flat glass sheets precut for bending to form the assembly of FIG. 1.

The assembly shown in FIG. 1 comprises an outer glass sheet 1 and an inner glass sheet 2 and is for use in the production of a laminated windshield. The assembly has a centre portion C terminating in tips S, which are bent sharply relative to the central portion C to extend rearwardly at the sides of the automobile, and a side extension R which is curved transversely into the vehicle roof. It will be seen that the assembly is formed with compound bends X.

To produce the assembly of FIG. 1 a flat glass sheet, precut to the shape shown in FIG. 3 and composed of clear plate glass A referred to above, was placed upon a skeleton type concave shaping surface adapted to impart to the glass sheet the shape of the assembly shown in FIG. 1. A second glass sheet, also precut to the shape shown in FIG. 3 but consisting of tinted plate glass B referred to above, was then superimposed on the first glass sheet after interposition of a parting agent between the two sheets. The two glass sheets together with the skeleton type concave shaping surface were then heated to glass bending temperature in a lehr.

In the assembly of FIG. 1 the glass sheet 1 is composed of clear glass A and the glass sheet 2 is composed of tinted glass B. If a convex shaping surface were used instead of a concave shaping surface, the outer glass sheet 1 would be of tinted glass B and the inner glass sheet 2 would be of clear glass A. Whatever the nature of the skeleton type shaping surface the assembly of FIG. 1 has good optical properties provided that the bending of the two sheets of glass is carried out with the sheet of tinted glass B superimposed upon the clear glass A.

The assembly shown in FIG. 1 may also be produced by separately press moulding each of the sheets 1 and 2 to the desired curvature, and only then bringing the sheets together. This method is especially useful when it is desired to form an assembly of sheets bent to an identical curvature having a compound bend with the outer sheet 1 consisting of the glass of higher heat absorptivity. The formation of compound bends by the use of a skeleton type convex shaping surface offers some difficulty.

After formation of the assembly of FIG. 1 by any of the methods mentioned above the assembly is used to produce a laminated windshield by interposing a plastic interlayer between the sheets and bonding the sheets to the interlayer by means of heat and pressure. The windshield is found to have good optical properties especially when tested for double reflection.

I claim:

1. A method of producing an assembly of two bent glass sheets having a compound bend comprising supporting a first flat glass sheet upon a shaping surface of skeleton outline adapted to impart said compound bend to said first glass sheet, said first glass sheet having a composition consisting essentially of:

| | Percent |
|---|---|
| $SiO_2$ | 69–74 |
| $Na_2O$ | 11–15 |
| CaO | 9–13 |
| MgO | 0.1–5 |
| $Fe_2O_3$ | 0.01–0.15 |
| $Al_2O_3$ | 0.1–1.3 |
| $SO_3$ | 0.1–0.5 |
| $Co_3O_4$ | 0–0.002 | superimposing on said first glass sheet a second flat glass sheet in immediate adjacency thereto consisting of glass having a greater heat absorptivity than the glass of which said first sheet consists, said second glass sheet having a composition consisting essentially of:

| | Percent |
|---|---|
| $SiO_2$ | 69–74 |
| $Na_2O$ | 11–15 |
| CaO | 9–13 |
| MgO | 0.1–5 |
| $Fe_2O_3$ | 0.3–0.7 |
| $Al_2O_3$ | 0.1–1.3 |
| $SO_3$ | 0.1–0.5 |
| $Co_3O_4$ | 0–0.002 | simultaneously heating the glass sheets to bending temperature while so supported and allowing the heated sheets to sag downwardly under the influence of gravity until they conform to said shaping surface and have acquired a curvature including said compound bend.

2. A method of producing an assembly of two bent glass sheets having a compound bend comprising supporting a first flat glass sheet upon a shaping surface of skeleton outline adapted to impart said compound bend to said first glass sheet, said first glass sheet having substantially the composition:

| | Percent |
|---|---|
| $SiO_2$ | 71.6 |
| $Na_2O$ | 13.6 |
| $CaO$ | 11.7 |
| $MgO$ | 2.4 |
| $Fe_2O_3$ | 0.1 |
| $Al_2O_3$ | 0.2 |
| $SO_3$ | 0.4 | superimposing on said first glass sheet a second flat glass in immediate adjacency thereto consisting of glass having a greater heat absorptivity than the glass of which said first sheet consists, said second glass sheet having substantially the composition:

| | Percent |
|---|---|
| $SiO_2$ | 71.4 |
| $Na_2O$ | 13.5 |
| $CaO$ | 11.7 |
| $MgO$ | 2.4 |
| $Fe_2O_2$ | 0.5 |
| $Al_2O_3$ | 0.2 |
| $SO_3$ | 0.3 | simultaneously heating the glass sheets to bending temperature while so supported and allowing the heated sheets to sag downwardly under the influence of gravity until they conform to said shaping surface and have acquired a curvature including said compound bend.

3. The method of claim 1 which comprises the further step of interposing a plastic interlayer between said first and second sheets and bonding the sheets to said interlayer by means of heat and pressure.

References Cited by the Examiner

UNITED STATES PATENTS

| 2,357,345 | 9/1944 | Moulton | 154—2.65 |
| 2,377,849 | 6/1945 | Binkert et al. | 49—84 |
| 2,444,976 | 7/1948 | Brown. | |
| 2,827,739 | 3/1958 | Atkeson | 156—102 |
| 2,860,059 | 11/1958 | Molter et al. | 156—106 |
| 2,880,553 | 4/1959 | Carson | 156—102 |
| 2,924,485 | 2/1960 | Miles | 156—102 |
| 3,021,227 | 2/1962 | Richardson | 117—37 |
| 3,116,991 | 1/1964 | Clerc et al. | 106—52 |

MORRIS SUSSMAN, *Primary Examiner.*

CARL F. KRAFFT, EARL M. BERGERT, ALEXANDER WYMAN, *Examiners.*

W. F. ZAGURSKI, W. J. VANBALEN,
*Assistant Examiners.*